Sept. 30, 1969     R. DENK     3,469,514

PHOTOGRAPHIC CAMERA FOR USE WITH DETACHABLE FLASH UNITS

Filed Dec. 14, 1966

INVENTOR.
RICHARD DENK
BY
Michael J. Striker
Atty

United States Patent Office 3,469,514
Patented Sept. 30, 1969

3,469,514
PHOTOGRAPHIC CAMERA FOR USE WITH
DETACHABLE FLASH UNITS
Richard Denk, Munich, Germany, assignor to Agfa-
Gevaert Aktiengesellschaft, Leverkusen, Germany
Filed Dec. 14, 1966, Ser. No. 601,614
Claims priority, application Germany, Dec. 17, 1965,
A 24,922
Int. Cl. G03b 19/02, 19/18
U.S. Cl. 95—11                                    10 Claims

ABSTRACT OF THE DISCLOSURE

The top wall of the housing in a photographic camera is provided with a slot which can receive a portion of a detachable flash unit. When the flash unit is detached, the slot is automatically sealed against entry of foreign matter by a plug which is reciprocable in the housing and is biased into the opening by a spring.

---

The present invention relates to photographic cameras, particularly to narrow-gauge movie cameras for use with detachable flash units.

It is already known to provide the housing of a photographic camera with an opening which can receive the foot of a flash unit when the user wishes to make exposures with flash. A serious drawback of such cameras is that the opening is exposed at all times so that it permits entry of dust or other foreign matter when the camera is used for making exposures in daylight. Also, the opening can detract from the eye-pleasing appearance of the camera.

Known proposals to provide a closure for the opening include the provision of a sliding door which is installed at the outer side of the housing or in the interior and must be manipulated by hand to move from closed to open position or vice versa. Such doors are likely to become stuck, they do not fill the opening, or their provision necessitates the use of specially designed carrying cases.

Accordingly, it is an important object of the present invention to provide a very simple closure for the opening in the housing of a camera and to construct and assemble the closure in such a way that it automatically seals the opening when the flash unit is detached so that the operator need not carry out any special steps in order to expose or seal the opening.

Another object of the invention is to provide a closure which, in addition to automatically sealing the opening when the flash unit is detached, also performs one or more additional functions without necessitating any attention on the part of the operator.

A further object of the invention is to provide a movie camera which embodies the improved closure.

An additional object of the invention is to provide a closure which contributes to the eye-pleasing appearance of the camera, which occupies little room, and which can be installed in presently known cameras by necessitating minimal changes in the design of the camera housing.

A concomitant object of the invention is to provide a closure which is fully concealed in the housing of a photographic camera and whose sealing action is fully automatic.

Briefly stated, one feature of my invention resides in the provision of a photographic camera, particularly a narrow-gauge movie camera, which can be used with a detachable flash unit of the type having a foot insertable into an opening in the housing of the camera. The camera comprises a housing having an opening dimensioned to receive the foot of a flash unit (e.g., a flashgun or an electronic flash), a closure in the form of a plug movably accommodated in the housing and having a sealing portion receivable in the opening to at least substantially fill the same when the flash unit is detached, and biasing means for urging the sealing portion into the opening. The action of such biasing means can be overcome by forcing the foot of a flash unit into the opening whereby the plug yields and its sealing portion is moved into the interior of the housing. Such inward movement of the sealing portion may be utilized to move a sutable filter into or out of registry with the objective of the camera and/or to place a filter into and out of the path of light rays impinging against the photo-sensitive element of an automatic exposure meter.

The opening preferably resembles an elongated slot and may be provided in the top panel of the camera housing. The plug is preferably guided by two guide walls of the housing which are inwardly adjacent to the opening, and at least one of such guide walls can be provided with suitable detent means for yieldably engaging the foot of a properly attached flash unit to hold the latter against the action of biasing means.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of a specific embodiment with reference to the accompanying drawings, in which:

Figure 2:
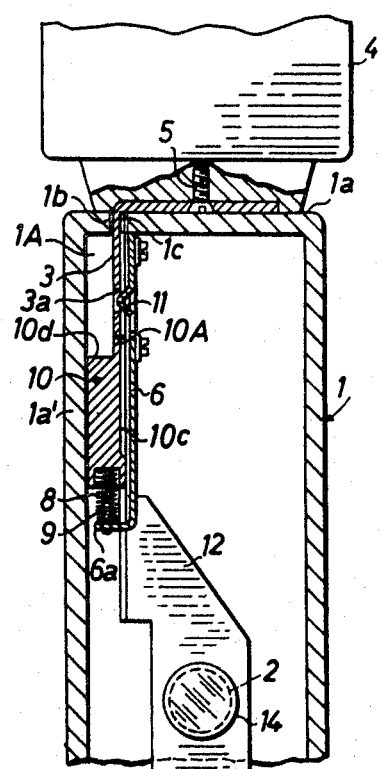
FIG. 2 is a similar section but with the flash unit attached to the camera housing.
Figure 3:
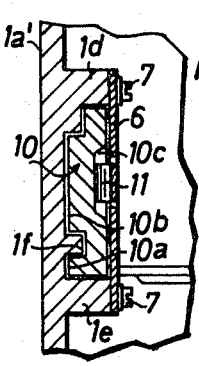
FIG. 3 is a horizontal section as seen in the direction of arrows from the line III—III of FIG. 1.
Figure 4:
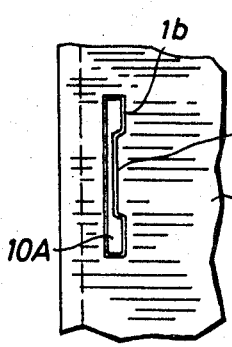
FIG. 4 is a fragmentary top plan view of the camera as seen in the direction of arrows from the line IV—IV of FIG. 1.

Referring to the drawings in detail, there is shown an 8-mm. movie camera having a flat housing or body 1 whose top panel 1a is formed with an elongated slot-shaped opening 1b best shown in FIG. 4. The opening 1b is of substantially rectangular outline but the panel 1a is preferably provided with a wide ridge 1c which extends into the opening so that the two end portions of the opening are wider than the central portion. The purpose of the opening 1b is to receive the foot 3 of a flash unit 4 which latter may constitute a flashgun or an electronic flash. The cross-sectional configuration of the foot 3 preferably resembles the outline of the opening 1b so that the latter is filled when the foot is inserted into the housing 1 in a manner as shown in FIG. 2. The numeral 5 denotes a screw or a like threaded fastener which is used to attach the foot 3 to the casing of the flash unit 4.

The inner end of the opening 1b communicates with a relatively wide internal compartment or chamber 1A which accommodates a vertically reciprocable closure 10 (hereinafter called plug for short), this plug having an upwardly extending sealing portion or tongue 10A which can be introduced into and then fills the opening 1b so that the top end face of the tongue 10A is flush with the external surface of the top panel 1a. The chamber 1A is bounded by two guide walls one of which is constituted by a side wall 1a' of the housing 1 and the other of which is constituted by a specially configurated plate 6 of sheet metal or the like. The side wall 1a' has two vertically extending ledges 1d, 1e which are connected to the plate 6 by means of screws 7. The inner end of the plate 6 is bent into a horizontal plane, as shown at 6a, and carries a pin-shaped retainer 9 for one end of a helical expansion spring 8 which constitutes a means for biasing the plug 10 upwardly in order to urge the sealing tongue 10A into the opening 1b. The upper end convolution or convolutions of the spring 8 extend into a recess provided therefor in the underside of the plug 10. One side face of the plug 10 is formed with vertically extending projections in the form of ribs 10a, 10b which extend into complementary grooves of the side wall 1a'. The latter is provided with a projection or rib 1f which extends into the groove between the ribs 10a, 10b so that the plug 10 is guided for movement up and down between the ledges 1d, 1e and guide walls 1a', 6.

A shoulder 10d of the plug 10 just below the tongue 10A constitutes a stop which cooperates with a complementary stop shoulder of the top panel 1a to arrest the plug against the action of the spring 8 when the tongue 10A fills the opening 1b. Furthermore, the plug 10 is provided with a vertical groove or channel 10c which is adjacent to the plate 6 and can receive a suitably configurated resilient detent 11 of the plate 6. This detent is slidable in the groove 10c and does not oppose the bias of the spring 8. Its function is to penetrate into an aperture 3a of the foot 3 when the latter is fully inserted into the chamber 1A and to yieldably hold the flash unit 4 in the position shown in FIG. 2. In order to attach the flash unit, the operator will place the foot 3 into registry with the sealing tongue 10A and will press the foot into the opening 1b to overcome the resistance of the spring 8. The plug 10 yields and moves downwardly in its chamber 1A so that the spring 8 stores energy. When the foot 3 is fully inserted, the detent 11 snaps into the aperture 3a and the flash unit 4 can be released by hand because the detent 11 is stronger than the spring 8, even when the latter is in fully compressed condition shown in FIG. 2. In order to detach the flash unit, the operator must exert a pull which suffices to overcome the resistance of the detent 11. The latter may be integral with or riveted, bolted or otherwise attached to the plate 6. When the flash unit 4 is detached, the shoulder 10d automatically engages the complementary stop shoulder of the top panel 1a to maintain the plug 10 in the upper end position in which the tongue 10A fills the opening 1b.

Figure 1:
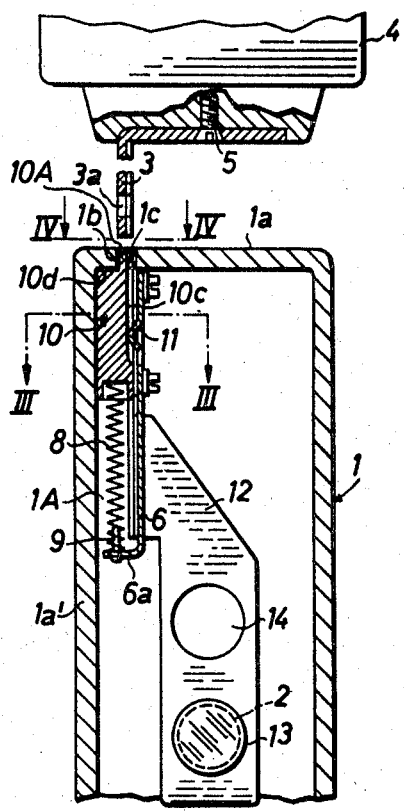
FIG. 1 is a fragmentary transverse vertical section through an 8-mm. movie camera which embodies by invention, the foot of a detachable flash unit being shown in a position directly above the opening which is sealed by the plug.

The plug 10 is rigidly connected with a motion transmitting holder or arm 12 which is rigid with an A-filter 13 and has a window 14. The filter 13 can be moved between the lower end position of FIG. 2 in which the window 14 registers with the objective 2 and an upper end position (FIG. 1) in which the filter registers with the objective. It will be seen that the filter 13 registers with the objective 2 when the camera is set to make exposures in daylight. Its purpose is to bring about automatic adjustments which are necessary to change the light intensity and/or the color effect. If desired, the holder 12 can carry a second filter (not shown) which can be moved into or from the path of light rays impinging against the photoresponsive resistor or cell of an automatic exposure meter. It will be seen that the plug 10 can perform several functions including automatically sealing the opening 1b when the flash unit 4 is detached, controlling the position of the filter 13, and/or controlling the position of additional filter means for the exposure meter.

A very important advantage of the plug 10 is seen to reside in that its movement to introduce the tongue 10A into the opening 1b is fully automatic and that the tongue preferably fills the opening 1b so that the interior of the housing 1 is sealed against entry of dust, moisture or other foreign matter. Furthermore, the tongue 10A enhances the appearance of the housing 1 and the provision of the plug 10 does not contribute to the bulk of the camera so that that the housing 1 can be stored in a conventional carrying case.

Any foreign matter which happens to enter the opening 1b while the plug 10 is held in the depressed or retracted position of FIG. 2 will be expelled automatically when the spring 8 is free to expand.

My present invention can be embodied in cameras wherein the opening 1b or an otherwise configurated opening is provided in a side wall of the housing. It is equally within the purview of my invention to connect or to provide the plug 10 with an exposure time setting device which automatically selects the exposure time for operation with flash when the plug 10 is moved to the position shown in FIG. 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. A photographic camera for use with detachable flash units, comprising a housing provided with an opening dimensioned to receive a portion of a flash unit; a plug movably accommodated in said housing and having a sealing portion receivable in said opening to at least substantially fill the same when the flash unit is detached; and biasing means for urging said sealing portion into said opening.

2. A photographic camera as defined in claim 1, further comprising an objective; filter means movable between a first position of registry with and a second position out of registry with said objective, and motion transmitting means responsive to movement of said sealing portion into said opening to move said filter means from one to the other position thereof.

3. A photographic camera as defined in claim 1, further comprising filter means movable in said housing between first and second positions and motion transmitting means responsive to movement of said sealing portion into said opening to thereby move said filter means from one to the other position thereof.

4. A photographic camera as defined in claim 3, wherein said motion transmitting means comprises a holder rigid with said plug and said filter means.

5. A photographic camera as defined in claim 1, wherein said housing comprises a pair of guide walls inwardly adjacent to said opening for guiding said plug during movement of said sealing portion into and from said opening.

6. A photographic camera as defined in claim 5, wherein at least one of said guide walls and said plug are provided with complementary projections and grooves to guide said sealing portion along a straight path into and from said opening.

7. A photographic camera as defined in claim 1, wherein said housing comprises a guide wall inwardly adjacent to said opening for guiding said plug during movements of said sealing portion into and from said opening, said wall having resilient foot-engaging detent means and said plug having a channel receiving said detent means.

8. A photographic camera as defined in claim 1, wherein in said plug and said housing comprise cooperating stop means for arresting the plug when said sealing portion enters and fills said opening.

9. A photographic camera as defined in claim 1, wherein said housing comprises an internal guide wall for guiding said plug during movements of said sealing portion into and from said opening, said guide wall having a spring retainer remote from said opening and said biasing means comprising a helical expansion spring operating between said retainer and said plug.

10. A photographic camera as defined in claim 1, wherein said housing comprises a top panel and said opening is an elongated slot provided in said top panel.

References Cited

UNITED STATES PATENTS

| | | | |
|---|---|---|---|
| 3,208,363 | 9/1965 | Easterly et al. | 95—11 |
| 3,373,671 | 3/1968 | Jakob | 95—11 |

NORTON ANSHER, Primary Examiner

CHARLES E. SMITH, Assistant Examiner